(12) United States Patent
Thomas

(10) Patent No.: US 10,787,179 B2
(45) Date of Patent: Sep. 29, 2020

(54) CABLE BICYCLE

(71) Applicant: THOMAS PUMP & MACHINERY, INC., Slidell, LA (US)

(72) Inventor: James W. Thomas, Slidell, LA (US)

(73) Assignee: THOMAS PUMP & MACHINERY, INC., Slidell, LA (US)

( * ) Notice: Subject to any disclaimer, the term of this patent is extended or adjusted under 35 U.S.C. 154(b) by 337 days.

(21) Appl. No.: 15/573,707

(22) PCT Filed: May 11, 2016

(86) PCT No.: PCT/US2016/031937
§ 371 (c)(1),
(2) Date: Nov. 13, 2017

(87) PCT Pub. No.: WO2016/183248
PCT Pub. Date: Nov. 17, 2016

(65) Prior Publication Data
US 2018/0118226 A1    May 3, 2018

Related U.S. Application Data

(60) Provisional application No. 62/159,749, filed on May 11, 2015.

(51) Int. Cl.
*B61B 7/06*    (2006.01)
*B61B 7/04*    (2006.01)
*A01D 90/00*   (2006.01)

(52) U.S. Cl.
CPC .............. *B61B 7/06* (2013.01); *B61B 7/04* (2013.01); *A01D 2090/005* (2013.01)

(58) Field of Classification Search
CPC ....... B61B 7/06; B61B 7/04; A01D 2090/005; A01D 46/00; A01D 46/24
See application file for complete search history.

(56) References Cited

U.S. PATENT DOCUMENTS 5,199,580 A       4/1993   Bankier
6,637,610 B1 *   10/2003   Cheeseboro ......... A61G 7/1015
                                                212/324
(Continued)

FOREIGN PATENT DOCUMENTS

CN    1514130    6/2004
GB    1153085    5/1969

OTHER PUBLICATIONS

Cohen, Galit, International Search Report, dated Sep. 11, 2016, Israel Patent Office, Israel.

*Primary Examiner* — Michael C Zarroli
(74) *Attorney, Agent, or Firm* — Garvey, Smith & Nehrbass, Patent Attorneys, L.L.C.; Mackenzie D. Rodriguez; Charles C. Garvey, Jr.

(57) ABSTRACT

The present invention may be a single or two-person pedal powered bicycle that rides on a cableway to pull agricultural products. A preferred embodiment has an option of an electric motor that provides power assist that operates on DC power from a battery that operates a DC motor. The electric motor operates on a battery that has a charging system to recharge at the end of the life cycle. The battery can preferably be charged with a convention 115 or 240 Volt battery charger or a solar powered charger. Also disclosed is a cable bicycle for use in moving people along a cable transport system.

10 Claims, 4 Drawing Sheets

(56) References Cited

U.S. PATENT DOCUMENTS

| | | | |
|---|---|---|---|
| 8,333,681 B2 * | 12/2012 | Schmidt | A63B 23/12 482/51 |
| 8,850,988 B2 * | 10/2014 | Creissels | B61B 7/02 104/112 |
| 9,145,148 B2 * | 9/2015 | Tilley | B61B 7/06 |
| 2008/0202375 A1 | 8/2008 | Quattlebaum | |
| 2010/0147180 A1 | 6/2010 | Perry | |

* cited by examiner

US 10,787,179 B2

CABLE BICYCLE

CROSS-REFERENCE TO RELATED APPLICATIONS

This is a nonprovisional patent application of U.S. Provisional Patent Application Ser. No. 62/159,749, filed 11 May 2015, which is hereby incorporated herein by reference.

Priority of U.S. Provisional Patent Application Ser. No. 62/159,749, filed 11 May 2015, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a cable supported transport device that can be used for example to transport loads (e.g., agricultural produce, flowers or other objects) from one locale to another. In an alternative embodiment, the apparatus can be used to transport humans along a cable line (or lines).

2. General Background of the Invention

Cableway systems provide major productivity increases in agriculture by improving the handling and movement of hand-harvested crops from the farm to a packing area. Cableway systems reduce labor costs and minimize damage to the crops caused by rough handling. In factories and warehouses all over the world, progressive managers have found that overhead conveyor systems help to improve productivity by moving goods efficiently and economically. Growers of agricultural products, faced with rising labor costs and demands for greater production, have investigated these systems and found that equipment costs were prohibitive. Industrial type overhead conveyors are particularly cost effective because the building structure itself is used for mounting the conveyors. However, on farms where large open areas are involved, the cost of building overhead structures and installing them is a substantial added expense.

Recognizing the need for a simple, reliable and inexpensive overhead material handling system for agriculture, a cableway system has been developed. Designed specifically for agricultural conveying, and easily installed by locally available labor, these cableway systems provide growers with all the advantages of improved material handling at reasonable cost. Now harvested crops can quickly and easily be moved from the field. Damage caused by poor handling is significantly reduced. Land utilization is significantly improved as the need for roadways and the associated costs of maintaining them is virtually eliminated. The cableway system works regardless of surface ground conditions. This simple overhead system can easily span rivers, creeks, canals and all types of irregular terrain. By making use of standardized components, growers can develop the "exact" system to meet their own particular needs.

Trolleys and carriers are used to move produce along the cableway. Multiple loads can be coupled together with spacer bars in "railroad" fashion, and the "train" can easily be pulled over a long distance regardless of ground conditions. Trolley wheels make movement fast and easy. A wide variety of carrier and trolley designs is available to suit virtually every kind of agricultural product.

Solid steel cable is the basic load-carrying element of the cableway system. Only about 11 mm in diameter, the cable is made of special alloy steel with breaking strength of over 8 tons. In addition to cable, other necessary cable accessories include: cable couplings, cable grippers, cable tensioning equipment, etc. Also available is a rigid track for use wherever curves or switches are required. Cable and track may be used together to meet all types of system layout requirements.

End posts together with earth anchors, are used for providing cable tension. This design makes for easy tensioning at the time the cable is first installed as well as allowing retensioning if it is ever required. Standard end posts are made of high strength steel and welded construction. They are available for both single and double cableway installations. Earth anchors are used at both ends of a cableway so that tension can be applied to the cable. The anchors are buried about 2 meters below ground level to prevent movement. Several types of anchors are available to suit different local soil conditions. Once the anchor is buried, no further attention is required for the life of the system. Typically, only two anchors are needed for each straight cable run, regardless of its length.

Support arches are the most common type of structure used for supporting the cable. Made of high strength galvanized steel tubing, they are generally spaced about 10 to 15 meters apart, according to the weight of the conveyed product. Special base plates and wedges are used to make installation quick and easy. In greenhouses and shade houses, cables are frequently supported by the existing overhead structure of the "house", and support arches are therefore not required.

Cable supports transfer the load on the cable to the supporting structure (arches, overhead beams, roof purlins, etc.) Two different series are available to suit various mounting requirements. A similar series of supports for rigid track is also available. Cable and track supports are easily installed by unskilled workmen.

A controlled tension is the key to the cableway system. Using a small, hand-operated hydraulic ram, tension of up to 5 tons is applied to the cable. Once the correct tension is applied, as indicated on the gauge, cable grippers automatically lock on the cable to maintain the desired tension. The ram and pump can then be removed for use elsewhere. If a cable ever loses tension, retensioning is easily accomplished using the same equipment. A cable in tension is surprisingly rigid. With supports about every 10 meters, the cable can carry greater loads than a bulky, heavyweight steel truck that costs 5 to 10 times more. By only requiring support about every 10 to 15 meters, the cost of support arches and support hardware is low, and of course, there is an additional savings in the reduced cost of installation. It is easy to see why, when large areas must be covered, the cableway system is the lowest cost material handling system available anywhere in the world.

The following possibly relevant US Patents are incorporated herein by reference: U.S. Pat. Nos. 5,280,936; 5,732,963; 7,600,771; 5,388,393; 4,455,816.

BRIEF SUMMARY OF THE INVENTION

The present invention provides a method of transporting produce. The method includes providing an elevated cable way that is supported at first and second portions with first and second spaced apart supports.

The method includes placing the produce on a rack that is suspended from the cable, the rack having an upper end portion with a hanger with one or more rollers that engage the cable way and a lower end portion that is spaced below the cable way.

The method also includes supporting a carriage on the cable, the carriage having an upper end portion that engages the cable with one or more drive rollers and a lower end portion having a seat, a pedal drive, and linkage that connects the pedal drive to the drive roller or rollers.

The method includes a worker attaching multiple of said racks on the cable at a first, loading station.

The method includes a carriage transporting a selected rack to a second, unloading station that is spaced away from the first loading station.

The method also includes a carriage connected to a selected one of the racks.

In one embodiment, a battery power source at least in part moves the carriage.

In one embodiment, a worker or workers add one or more racks loaded with produce to the cable.

In one embodiment, the carriage has two seats and two sets of pedals.

In one embodiment, the carriage includes an upper horizontal member, a lower horizontal member, a pair of longitudinal members that span between each said upper and lower horizontal member, and an operator's seat on the lower horizontal member.

In one embodiment, the carriage attaches to a said rack when the carriage is moved to contact the rack.

In one embodiment, the cable way with multiple arches that are spaced apart at intervals.

In one embodiment, each arch is sized and shaped to enable passage of the carriage through the arch.

In one embodiment, the arch is sized and shaped to enable passage therethrough of both the carriage and a said rack loaded with produce.

The present invention provides a method of transporting produce.

The method includes providing an elevated cable way that is supported at first and second end portions with anchor posts and at intervals between said anchor posts with one or more arches.

The method also includes placing the produce on a rack that is suspended from the cable, the rack having an upper end portion with a hanger with one or more rollers that engage the cable way and a lower end portion that is spaced below the cable way.

The method includes supporting a carriage on the cable, the carriage having an upper end portion that engages the cable with one or more drive rollers and a lower end portion having a seat, a pedal drive, and linkage that connects the pedal drive to the drive roller or rollers.

The method includes a worker attaching multiple of said racks on the cable at a first, loading station.

The method includes a carriage transporting a selected rack to a second, unloading station that is spaced away from the first loading station.

The method also includes a carriage connected to a selected one of the racks.

In one embodiment a battery power source at least in part moves the carriage.

In one embodiment, a worker or workers add one or more racks loaded with produce to the cable.

In one embodiment, the carriage has two seats and two sets of pedals.

In one embodiment, the carriage includes an upper horizontal member, a lower horizontal member, a pair of longitudinal members that span between each said upper and lower horizontal member, and an operator's seat on the lower horizontal member.

In one embodiment, the carriage attaches to a said rack when the carriage is moved to contact the rack.

In one embodiment, a worker occupies a seat on the carriage that is below the cable way.

In one embodiment, two said workers occupy two seats on the carriage below the cable way.

In one embodiment, the cable way is above an underlying support surface, around or floor and the worker is positioned closer to the underlying support surface, ground or floor than to the cable way.

In one embodiment, the cable way is above an underlying support surface, around or floor and the workers are positioned closer to the underlying support surface, ground or floor than to the cable way.

In one embodiment, workers who occupy the underlying support surface, ground, or floor place the produce in step "b".

In one embodiment, workers who occupy the underlying support surface, ground, or floor occupy the seat in step "e".

The present invention provides a method of a cable and arch supported produce transport apparatus.

The method includes a cable way having end portions connected to first and second anchor posts, said cable way positioned above an underlying support surface.

The method also includes one or more arches that rest upon the underlying support surface and that attach to the cable, each arch having an interior passage space.

The method also includes a carriage mounted on the cable way with one or more rollers, said carriage having a pedal operated drive that moves the carriage responsive to a user pedaling the pedals.

The method includes a carriage including a seat for supporting the user above the underlying support surface.

The method also includes multiple racks that are configured to hold produce to be transported along the cable way.

The method includes a connector that enables connection of the carriage to the rack;

The method also includes a cable way being supported a small enough distance from the underlying support surface that workers standing on the underlying support surface can place produce on the rack and access the carriage seat.

In one embodiment, the carriage has a pair of said seats and a pair of said pedal operated drives.

In one embodiment, the pedal operated drive includes at least one chain or belt.

In one embodiment, the carriage attaches to the cable way at first and second roller positions and the seat is in between said roller positions.

In one embodiment, the drive connects to the cable way at only one of said roller positions.

In one embodiment, the carriage is comprised of an upper generally horizontally extending member, a lower generally horizontally extending member, and a pair of inclined members that each extend between said upper generally horizontally extending member and said lower generally horizontally extending member.

In one embodiment, the pedal operated drive extends from said lower generally horizontally extending member to said upper generally horizontally extending member.

In one embodiment, the pedal operated drive is located next to the connection of said lower generally horizontally extending member and a said inclined member.

The apparatus of the present invention is a human powered "tractor" that replaces the current diesel powered tractors or humans who pull the trains of produce long distances. The apparatus of the present invention is more eco-friendly than the diesel tractor and as it does not pollute the air or land and requires little maintenance. In areas where manpower is used, the apparatus of the present invention requires less effort than pulling produce by hand and is more humane. In one embodiment, an electric motor can be plugged in to recharge, or can be recharged using solar power.

The present invention can include a bicycle motor arrangement to be used on cableway systems that are in place, to thus aid in transport of people such as on mountainous terrain or other areas where walking and hiking are difficult based on the geography. For example, such is the cable systems in place in Nepal.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
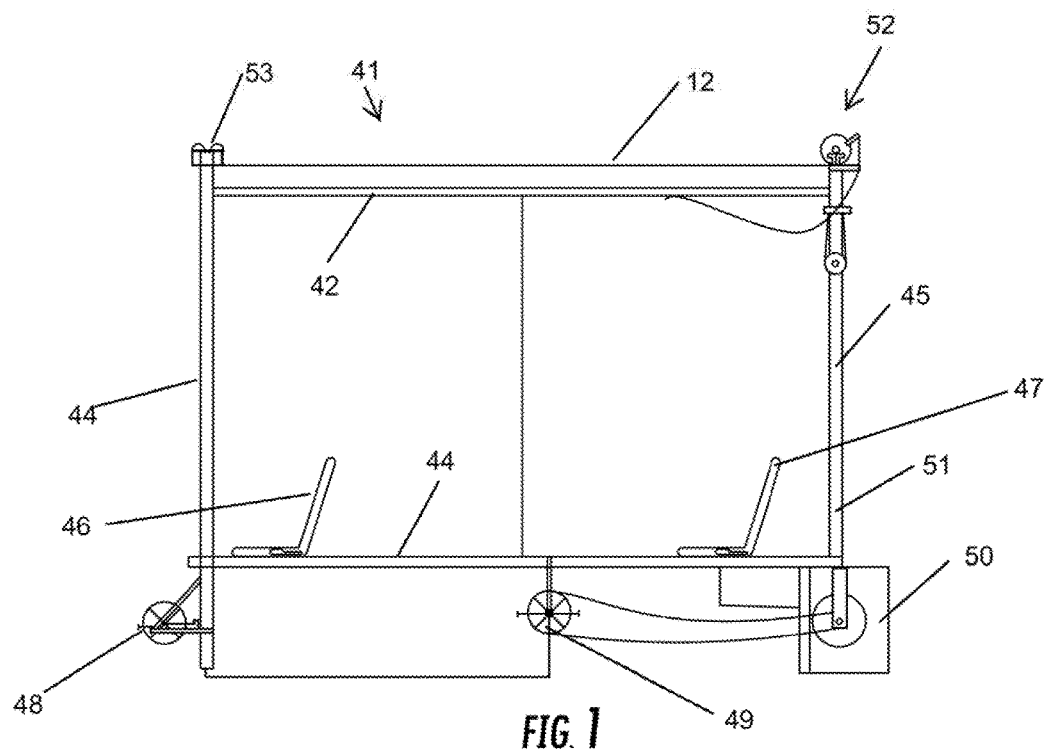
FIG. 1 is a preferred embodiment of the apparatus of the present invention.

The cableway system was developed to transport agricultural products, for example bananas 27 as shown in the drawings, from the field to the packing station in an efficient manner. The product is transported over long distances by means of rollers or trolleys 26 that travel on a fixed 11 mm cable 12.

In prior art, a diesel powered hanging tractor is used to pull large quantities over long distances. In lieu of using the diesel powered tractor, man haul is also used. There exists a need for a more environmentally friendly method to move the product and at the same time replace manual labor where it is used.

Figure 2:
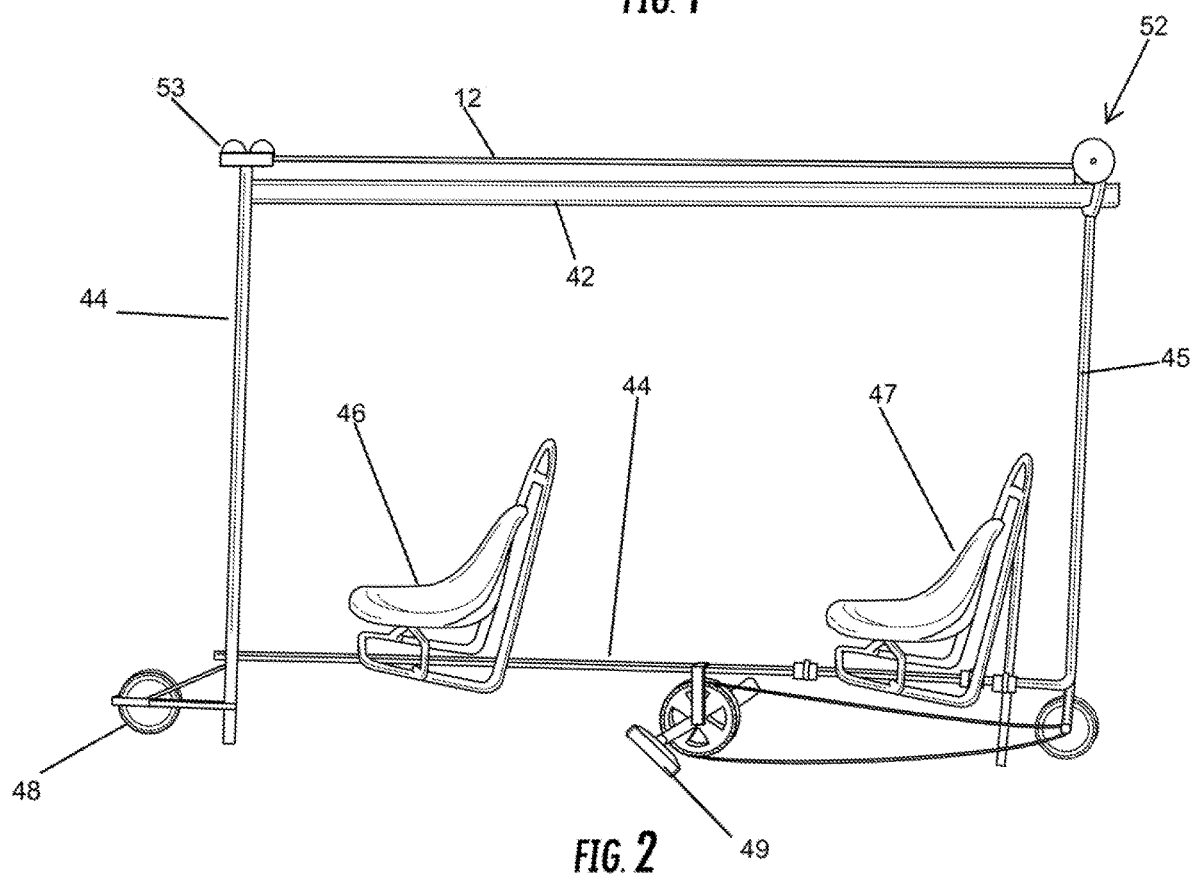
FIG. 2 is a preferred embodiment of the apparatus of the present invention.
Figure 3:
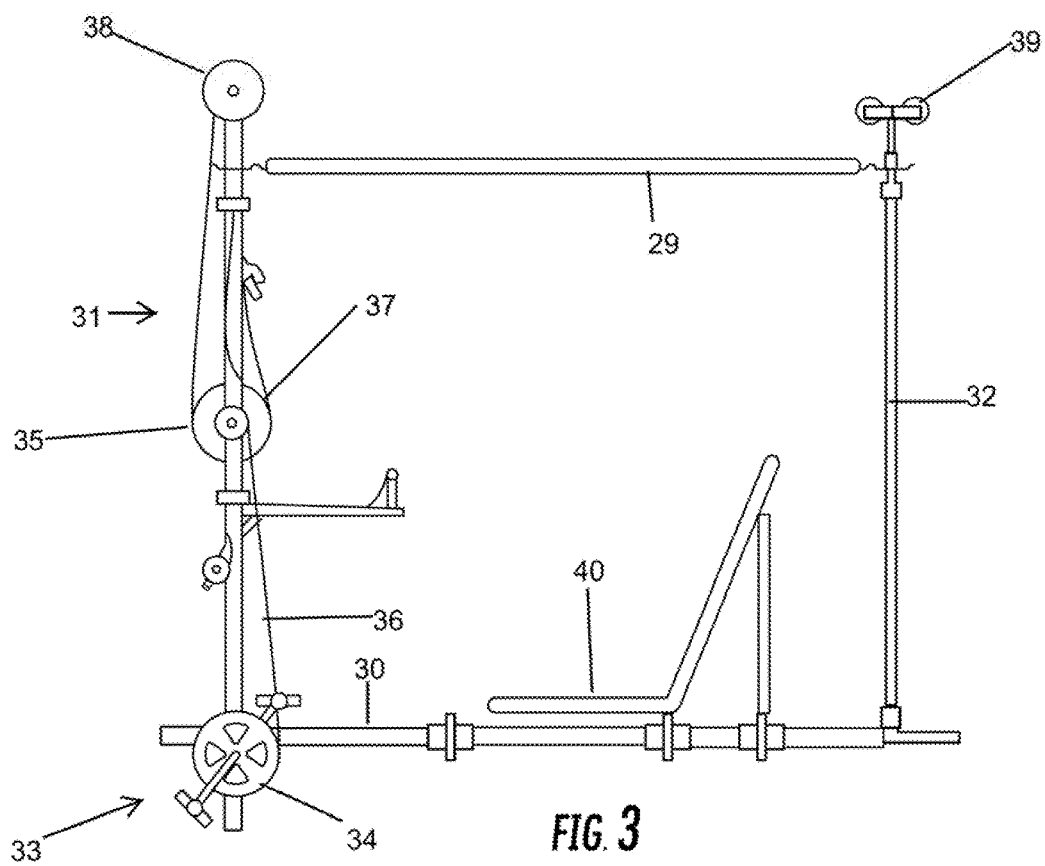
FIG. 3 is a preferred embodiment of the apparatus of the present invention.
Figure 4:
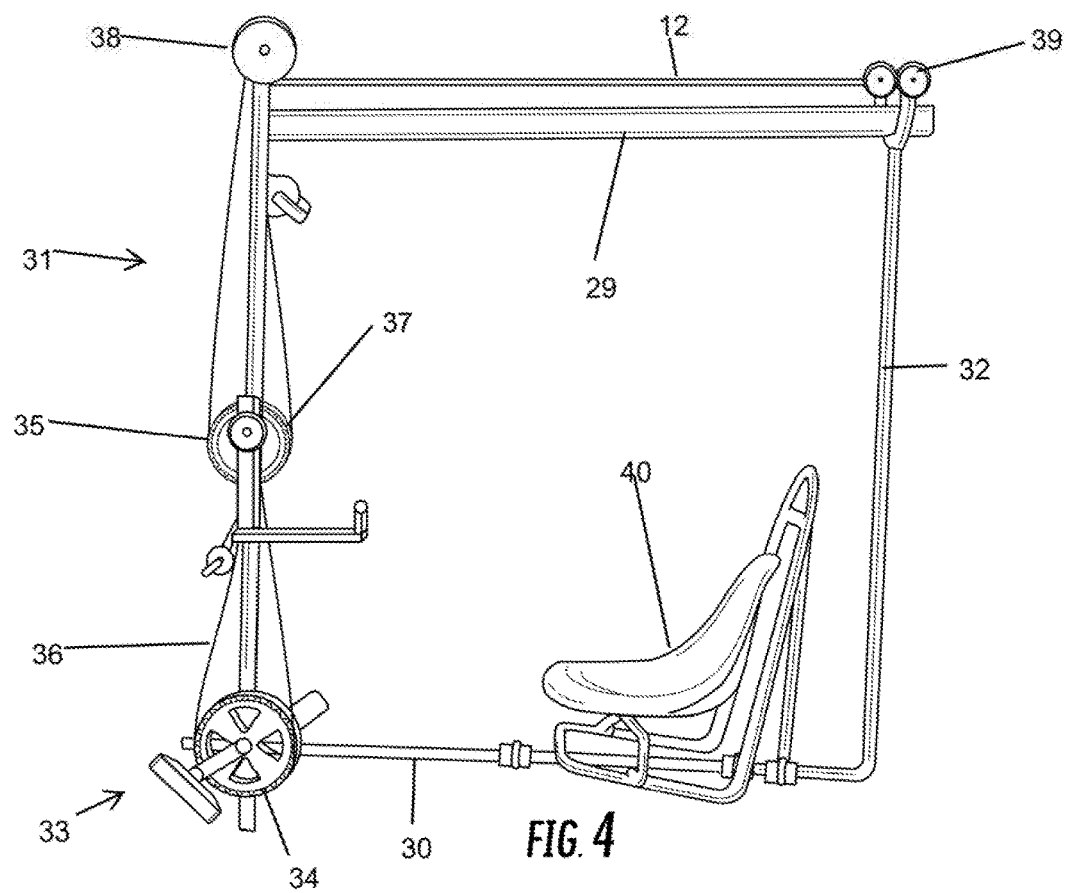
FIG. 4 is a preferred embodiment of the apparatus of the present invention.

The Cableway Eco-Bike shown in FIGS. 1-4 solves that problem. It may be a single (FIG. 2) or two-person pedal powered bicycle that rides on the cableway 11 to pull agricultural products 27. FIG. 3 shows the system in use with banana crops and a two-person bicycle.

The present invention is a product transport system 10. The system includes a cable way 11 similar to the prior art method that hauls agricultural products, such as produce including bananas 27 as shown in the figures, along a cable 12. Instead of a diesel engine, the cable way 11 is powered by a man-powered bicycle.

The cable way 12 begins with an anchor post 13 that anchors the cable way 12 to the underlying support surface (floor or ground) 14. The anchor post is supported by a foot 15. The cable way 12 is supported throughout by arches 16 spaced along the cable way 12. Each arch 16 has two included members 17, 18 on either side of the cable way 12, and a transverse member 19 that connects the two inclined members 17, 18 above the cable way 12. The arches 16 support the cable way 12 via a hanger/cable support 20 that extends down from the transverse member 19 of the arch 16 as shown in FIG. 3. Each arch is supported by feet 21, 22 on the bottom of the inclined members 17, 18 that sit on the ground 14. This design allows the cable way 12 to flow through the opening/arch way/space 23 created by the arches 16.

Depending on the terrain and the path the produce 27 needed to take to get from the field to the packing station, the cable way 12 may have one or more ell turns 24, for example, as shown in FIG. 3.

Produce 27 moves along the cable way 12 via a trolley/rack 25 with rollers 26 that sit on the cable way 12. Each trolley 25 has a hook member that is preferably shaped to support the produce to be transported. The trolleys 25 are spaced apart on the cable way 12 with spacer bars (not shown, similar to upper generally horizontal members 29, 42) that prevent the produce 27 from bumping into each other and damaging the products.

Figure 5:
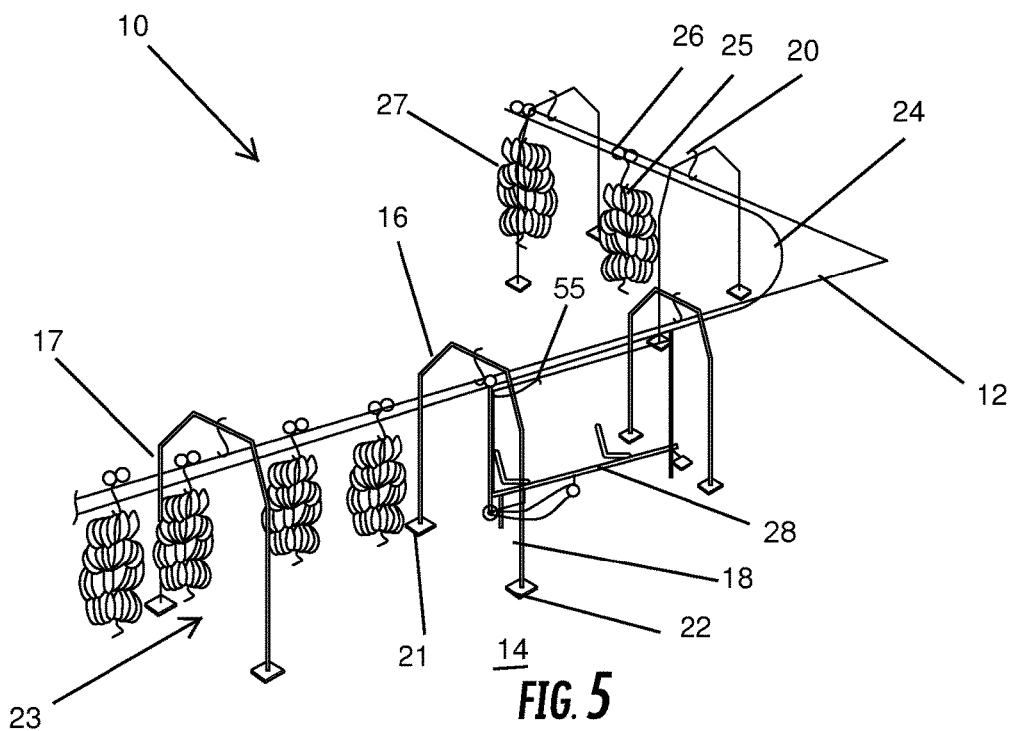
FIG. 5 is a perspective view of a preferred embodiment of the system of the present invention.
Figure 6:
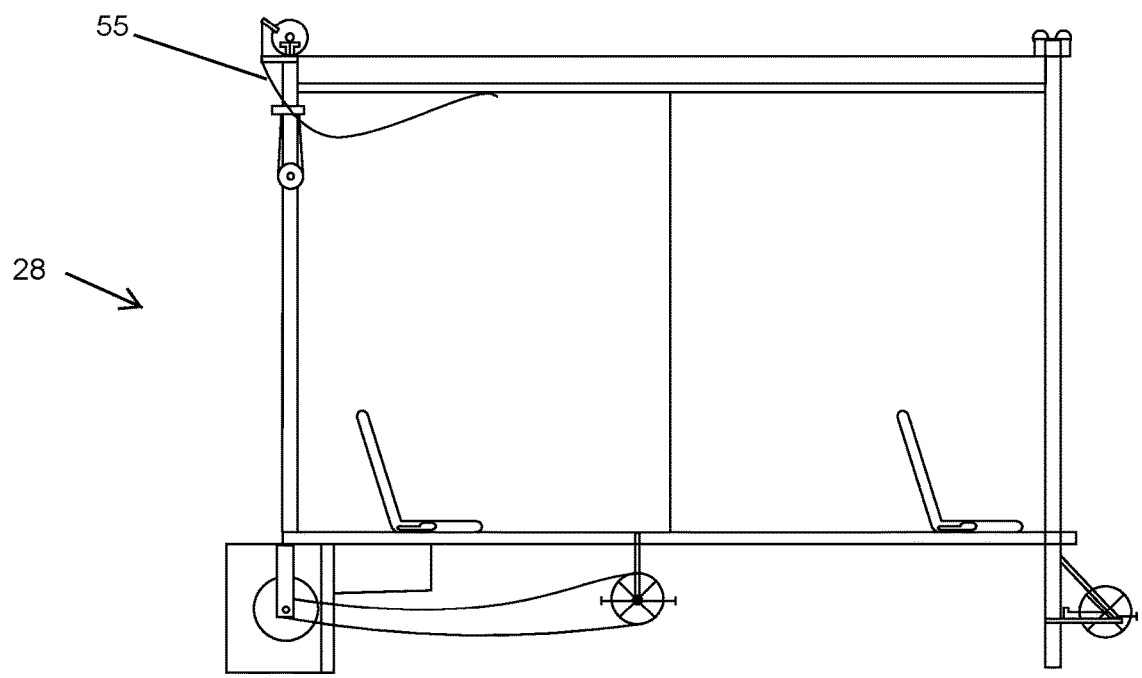
FIG. 6 is a preferred embodiment of the apparatus of the present invention.
Figure 7:
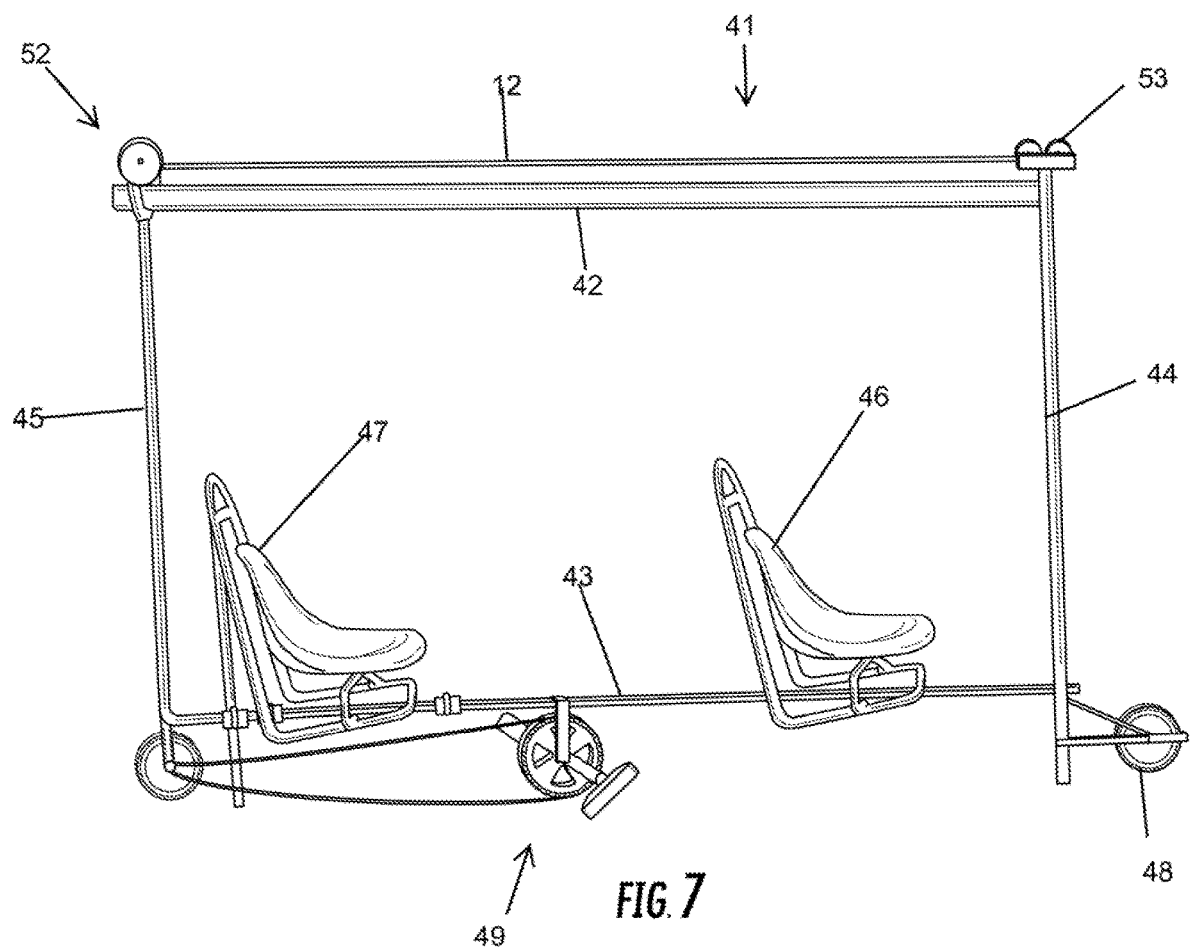
FIG. 7 is a preferred embodiment of the apparatus of the present invention.

In the system of the present invention 10, the cable way 12 is powered by a cable bicycle comprising a carriage 28, a drive/pedal drive 33, pedal and sprocket/chain wheel assembly 34, idler sprocket 35, upper and lower drive chain belts 36, 37, cable engaging drive pulley/cable engaging drive roller 38, and one or more idler rollers 39. The cable bicycle may also include at least one seat 40, as shown in FIG. 2. The carriage 28 preferably has an upper generally horizontal member 29 and a lower generally horizontal member 30, a first inclined member 31 and a second inclined member 32. In some embodiments, as shown in FIGS. 5 and 6, the carriage 28 includes a drive plate 55. In this embodiment, the carriage 28 can be connected to one or more of the racks 25 carrying produce 27 via the rack 25 (the same rack 25 that is used to connect the produce 27), that connects by attaching to the rollers 26 on the carriage 28 to the tractor drive plate 55. Preferably, the rollers 26 are welded to the drive plate 55.

In one embodiment as shown in FIG. 1, the carriage 41 has an upper generally horizontal member 42 and a lower generally horizontal member 43, a first inclined member 44 and a second inclined member 45. This embodiment preferably has at least two seats 46, 47, and at least two pedal drives 48, 49. Preferably, the bicycle of the present invention includes a combination electrical/pedal drive 50, connected to the cable way 12 via a linkage 51. When the electric drive is powered, the linkage 51 causes the one or more drive rollers 52 to move along the cable way 12, which in turn cause the idler rollers 53 to move along the cable way 12 moving the produce 27 from the field.

A preferred embodiment of the apparatus of the present invention has an option of an electric motor that provides power assist that operates on DC power from a battery that operates a DC motor. In this embodiment (not shown), the Cableway Eco-Bike rides on the cable 12 and is driven by the DC motor using a tire. In one embodiment of the apparatus of the present invention, the tire is preferably made out of urethane. that the drive train can be a pedal drive train with electrical assist, noting that such drive trains are commercially available (e.g. Giant Lite, electric assisted bike).

In one embodiment of the apparatus of the present invention, the electric motor operates on a battery that preferably has a charging system to recharge at the end of the life cycle. The battery can preferably be charged with a convention 115 or 240 Volt battery charger or a solar powered charger.

The various parts to attach the banana carriers to the cables and the banana carriers to one another are known and can be found in the catalog available on the internet at http://thomascableway com/images/Catalog.pdf.

A cable cycle such as the one shown at http://www.floridatravellife.com/blogs/soaring-canopy-cycle-florida-ecosafaris can be used to pull the banana carriers, with a suitable link between the cable cycle and the banana carriers sold at http://thomascableway.com/images/Catalog.pdf Appropriate linkages are included to transfer pedal power to the cables to allow the bike to move along the cables.

The result is an Eco-Friendly method to move bananas, flowers, and other products from the field to the packing station without fossil fuels, resulting in little or no pollution or with much less human effort.

The following is a list of parts and materials suitable for use in the present invention:

PARTS LIST

| PART NUMBER | DESCRIPTION |
| --- | --- |
| 10 | product transport system |
| 11 | cable way |
| 12 | cable |
| 13 | anchor post |
| 14 | underlying support surface, floor, ground |
| 15 | foot |
| 16 | arch |
| 17 | inclined member |
| 18 | inclined member |
| 19 | transverse member |
| 20 | hanger/cable support |
| 21 | foot |
| 22 | foot |
| 23 | opening/arch way/space |
| 24 | ell/turn |
| 25 | trolley/rack |
| 26 | roller/rollers |
| 27 | produce/bananas |
| 28 | carriage |
| 29 | upper generally horizontal member |
| 30 | lower generally horizontal member |
| 31 | first inclined member |
| 32 | second inclined member |
| 33 | drive/pedal drive |
| 34 | pedal and sprocket/chain wheel assembly |
| 35 | idler sprocket |
| 36 | lower drive chain/belt |
| 37 | upper drive chain/belt |
| 38 | cable engaging drive pulley/cable engaging drive roller |
| 39 | idler roller/rollers |
| 40 | seat |
| 41 | carriage |
| 42 | upper generally horizontally extending member |
| 43 | lower generally horizontally extending member |
| 44 | inclined member |
| 45 | inclined member |
| 46 | seat |
| 47 | seat |

-continued

| PART NUMBER | DESCRIPTION |
| --- | --- |
| 48 | pedal drive |
| 49 | pedal drive |
| 50 | combination electrical/pedal drive |
| 51 | linkage |
| 52 | drive roller/rollers |
| 53 | idler rollers |
| 55 | drive plate |

All measurements disclosed herein are at standard temperature and pressure, at sea level on Earth, unless indicated otherwise. All materials used, or intended to be used, in a human being are biocompatible, unless indicated otherwise.

The foregoing embodiments are presented by way of example only; the scope of the present invention is to be limited only by the following claims.

The invention claimed is:

1. A cable and arch supported produce transport apparatus, comprising;
  a) a cable way having end portions connected to first and second anchor posts, said cable way positioned above an underlying support surface;
  b) one or more arches that rest upon the underlying support surface and that attach to the cable way, each of the one or more arches having an interior passage space;
  c) a carriage including pedals mounted on the cable way with one or more rollers, said carriage having a pedal operated drive that moves the carriage responsive to a user pedaling the pedals;
  d) the carriage including a seat for supporting the user above the underlying support surface;
  e) multiple racks that are configured to hold produce to be transported along the cable way;
  f) a connector that enables connection of the carriage to one or more of the multiple racks;
  g) the cable way being supported a small enough distance from the underlying support surface that workers standing on the underlying support surface can place produce on one or more of the multiple racks and access the carriage seat;
  wherein the carriage is comprised of an upper generally horizontally extending member, a lower generally horizontally extending member, and a pair of inclined members that each extend between said upper generally horizontally extending member and said lower generally horizontally extending member; and,
  wherein the pedal operated drive extends from said lower generally horizontally extending member to said upper generally horizontally extending member.

2. A cable and arch supported produce transport apparatus, comprising;
  a) a cable way having end portions connected to first and second anchor posts, said cable way positioned above an underlying support surface;
  b) one or more arches that rest upon the underlying support surface and that attach to the cable way, each of the one or more arches having an interior passage space;
  c) a carriage including pedals mounted on the cable way with one or more rollers, said carriage having a pedal operated drive that moves the carriage responsive to a user pedaling the pedals;
  d) the carriage including a seat for supporting the user above the underlying support surface;

e) multiple racks that are configured to hold produce to be transported along the cable way;
f) a connector that enables connection of the carriage to one or more of the multiple racks;
g) the cable way being supported a small enough distance from the underlying support surface that workers standing on the underlying support surface can place produce on one or more of the multiple racks and access the carriage seat;

wherein the carriage is comprised of an upper generally horizontally extending member, a lower generally horizontally extending member, and a pair of inclined members that each extend between said upper generally horizontally extending member and said lower generally horizontally extending member; and wherein the pedal operated drive is located next to the connection of said lower generally horizontally extending member and a said inclined member.

3. The apparatus of claim 1 wherein the carriage has a pair of said seats and a pair of said pedal operated drives.

4. The apparatus of claim 1 wherein the pedal operated drive includes at least one chain or belt.

5. The apparatus of claim 1 wherein the carriage attaches to the cable way at first and second roller positions and the seat is in between said first and second roller positions.

6. The apparatus of claim 5 wherein the pedal operated drive connects to the cable way at only one of said first and second roller positions.

7. The apparatus of claim 2 wherein the carriage has a pair of said seats and a pair of said pedal operated drives.

8. The apparatus of claim 2 wherein the pedal operated drive includes at least one chain or belt.

9. The apparatus of claim 2 wherein the carriage attaches to the cable way at first and second roller positions and the seat is in between said first and second roller positions.

10. The apparatus of claim 9 wherein the pedal operated drive connects to the cable way at only one of said first and second roller positions.

* * * * *